Jan. 28, 1964   R. L. VOGELPOHL   3,119,681
GLASS FORMING MOLDS

Filed March 28, 1960   3 Sheets-Sheet 1

INVENTOR.
R. L. VOGELPOHL
BY W. A. SCHAICH &
E. J. HOLLER
ATTORNEYS

Jan. 28, 1964 R. L. VOGELPOHL 3,119,681
GLASS FORMING MOLDS
Filed March 28, 1960 3 Sheets-Sheet 2

INVENTOR.
R. L. VOGELPOHL
BY W. A. SCHAICH &
E. J. HOLLER
ATTORNEYS

Jan. 28, 1964    R. L. VOGELPOHL    3,119,681
GLASS FORMING MOLDS
Filed March 28, 1960    3 Sheets-Sheet 3

INVENTOR.
R. L. VOGELPOHL
BY W. A. SCHAICH &
E. J. HOLLER
ATTORNEYS

United States Patent Office 3,119,681
Patented Jan. 28, 1964

3,119,681
GLASS FORMING MOLDS
Rol L. Vogelpohl, Gahanna, Ohio, assignor, by mesne assignments, to Owens-Illinois Glass Company, Toledo, Ohio, a corporation of Ohio
Filed Mar. 28, 1960, Ser. No. 18,148
11 Claims. (Cl. 65—356)

The present invention relates to the manufacture of glassware and particularly to means for regulating and controlling the temperature of glass forming elements. The invention in the form herein illustrated and described provides a novel means for cooling, regulating and maintaining the thermal balance of a press mold used for pressing and molding hot glass articles in conjunction with a press plunger.

Glass articles such as television tube faces, implosion panels for television tube envelopes and glass block halves are customarily formed by placing a charge of hot molten glass in a press mold having an internal molding surface corresponding to the external configuration of the article to be formed and moving a press plunger downwardly into contact with the glass to displace the glass throughout the molding cavity and form the glass article. The plunger has external molding surfaces corresponding to the internal configuration of the article which is to be formed. It is extremely important in such press molding operation that the glass forming surfaces of both the press mold and press plunger be maintained within known working limits for the particular glass being formed. If the glass forming surfaces are permitted to operate at temperatures exceeding the maximum working limit, the glass will stick thereto causing imperfections in the article on separation of the forming surfaces or on its removal from the press mold. If the glass forming surfaces are permitted to operate below the minimum working temperatures, the glass will crizzle and form imperfections known as "chill wrinkles." Either of these extreme temperature conditions is objectionable in the successful low-cost manufacture of glass articles by press molding and must be avoided.

The invention in its preferred form as herein illustrated and described is embodied in a press molding machine utilized in molding face plates for television picture tube envelopes although the machine is equally applicable to molding various other forms of glassware. The machine as shown comprises a mold table intermittently rotated, step by step, about a vertical axis and molding units on the mold table are brought in succession to a press molding station. Each molding unit comprises a body mold and a ring mold for molding the rim portion of the article. The outer ring or shell which surrounds the body mold is removed therefrom after pressing leaving the mold article free for removal.

Where the glass article which is being formed is essentially planar or has slightly curved surfaces in one plane, the control of operating temperatures of the glass forming surfaces is relatively easy. However, in forming hollow glass articles having a base portion and a peripheral flange portion which connect at sharp curves, the problem of temperature control of the forming elements becomes more difficult. The sharp curves or corners of the glass article connecting its several portions present molding problems wherein localized conditions of both hot and cold areas of the glass working surfaces may exist concurrently so that the glass may tend to stick in one area and crizzle in another. These undesirable effects upon the glass as formed are directly related to proper maintenance of stable thermal conditions of the press molding equipment during its continuous use. The present invention is concerned with the elimination of such difficulties.

Accordingly, it is an object of the present invention to provide a novel mold construction which will permit effective thermal balancing of the press mold for continuous operation and provide improved distribution and quality of the glass product or other thermoplastic material being molded and overcome various difficulties encountered in the use of conventional mold cooling methods and constructions.

Another object of this invention is to provide press molding apparatus for forming hollow glass articles having a base portion and a flange portion wherein the glass forming surfaces of the molding unit providing a mold cavity do not exceed the limits of working temperatures of the glass thereby avoiding sticking of the glass and the formation of crizzles or chill wrinkles in the glass.

Another object of the invention is to provide a mold construction in which an improved heat balance is maintained during its continuous usage on a rotary press molding machine.

A further object of the invention is to provide a hollow mold having a concave molding surface at a central region which is substantially uniform in thickness and means for supplying and regulating the application of a continuous layer of gaseous coolant over the underside of the central molding region of the mold for maintaining more efficient heat transfer from the mold to the cooling medium.

A still further object of the present invention is to provide a hollow mold unit having a concave upper molding surface at an interior region, the mold being supported at a peripheral region by an annular support pedestal, cooling means introduced axially of said mold unit upwardly through said support pedestal and guiding means for distributing a continuous radially projecting layer of gaseous coolant over the underside of said concave molding surface.

Other objects of the invention and the precise nature thereof will appear more fully hereinafter.

Referring to the accompanying drawings:

FIG. 5 is a side elevational view partly in vertical section of a modification of the mold and support pedestal assembly illustrating another form of coolant guiding means.

Figure 1:
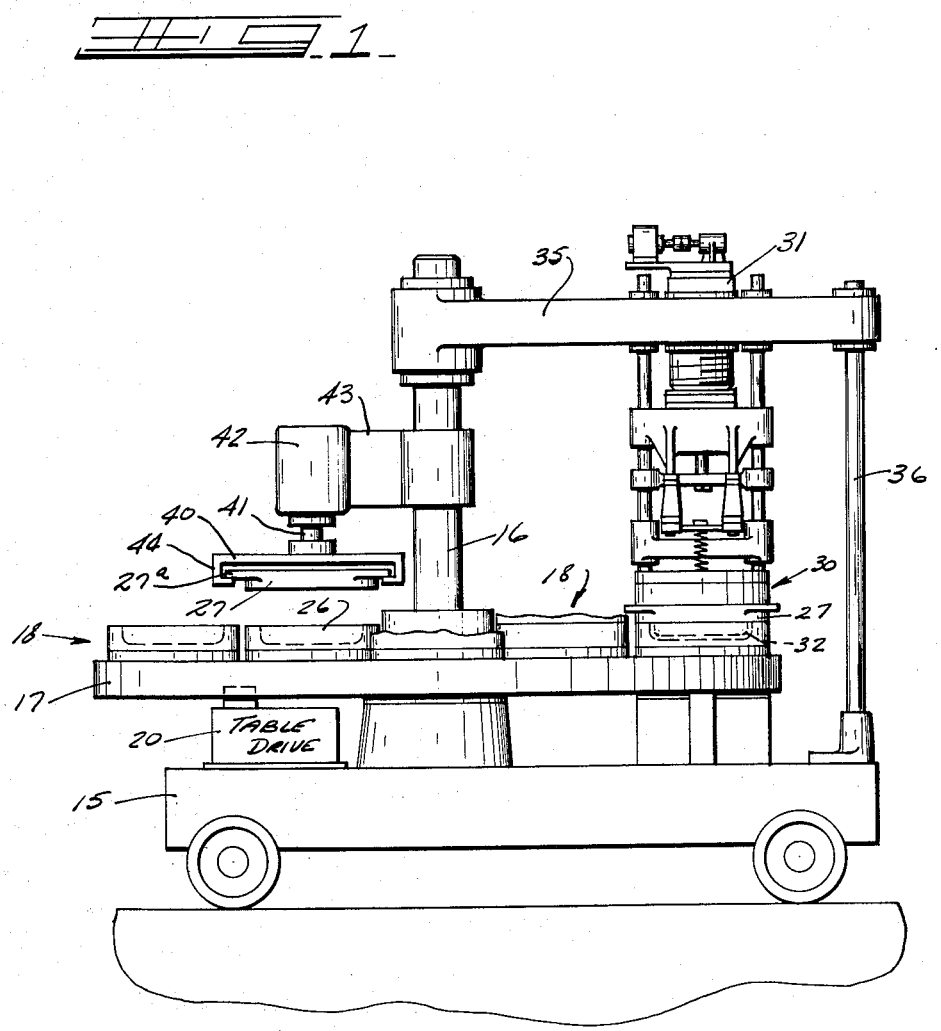
FIG. 1 is an elevational view of a press molding machine in which the present invention is embodied.

Referring to FIG. 1, the machine is mounted on a base 15 from which rises a stationary column 16. A mold table 17 has mounted thereon a plurality of mold units 18 arranged in an annular series around the column 16. The mold table 17 is rotated intermittently, step by step, by means of a table drive mechanism 20 which is of the usual construction well known in the prior art. Each mold unit 18 is brought by rotation of the mold table to stations numbered 1 to 11 as shown diagrammatically in FIG. 2. These include a mold charging station 10 at which a charge or gob of molten glass is placed in each mold, a press molding station 1 where the article is press molded, a take-out station 4 at which the article is removed from the mold, intermediate cooling stations at which the article is cooled into final form, and stations at which the mold is empty.

Each stepwise rotation of the mold table 17 is through an angular distance twice the distance between adjoining stations so that the article molded at station 1 travels through more than one complete rotation of the mold table before it arrives at take-out station 4. Following the press molding at station 1 each article is held stationary within its respective mold at the cooling stations 3, 5, 7, 9, 11 and 2 in succession during further rotation of the mold table before arriving at the take-out station 4. After removal of the molded article at station 4, the mold remains empty while at stations 6 and 8 prior to being recharged at station 10.

Figure 2:
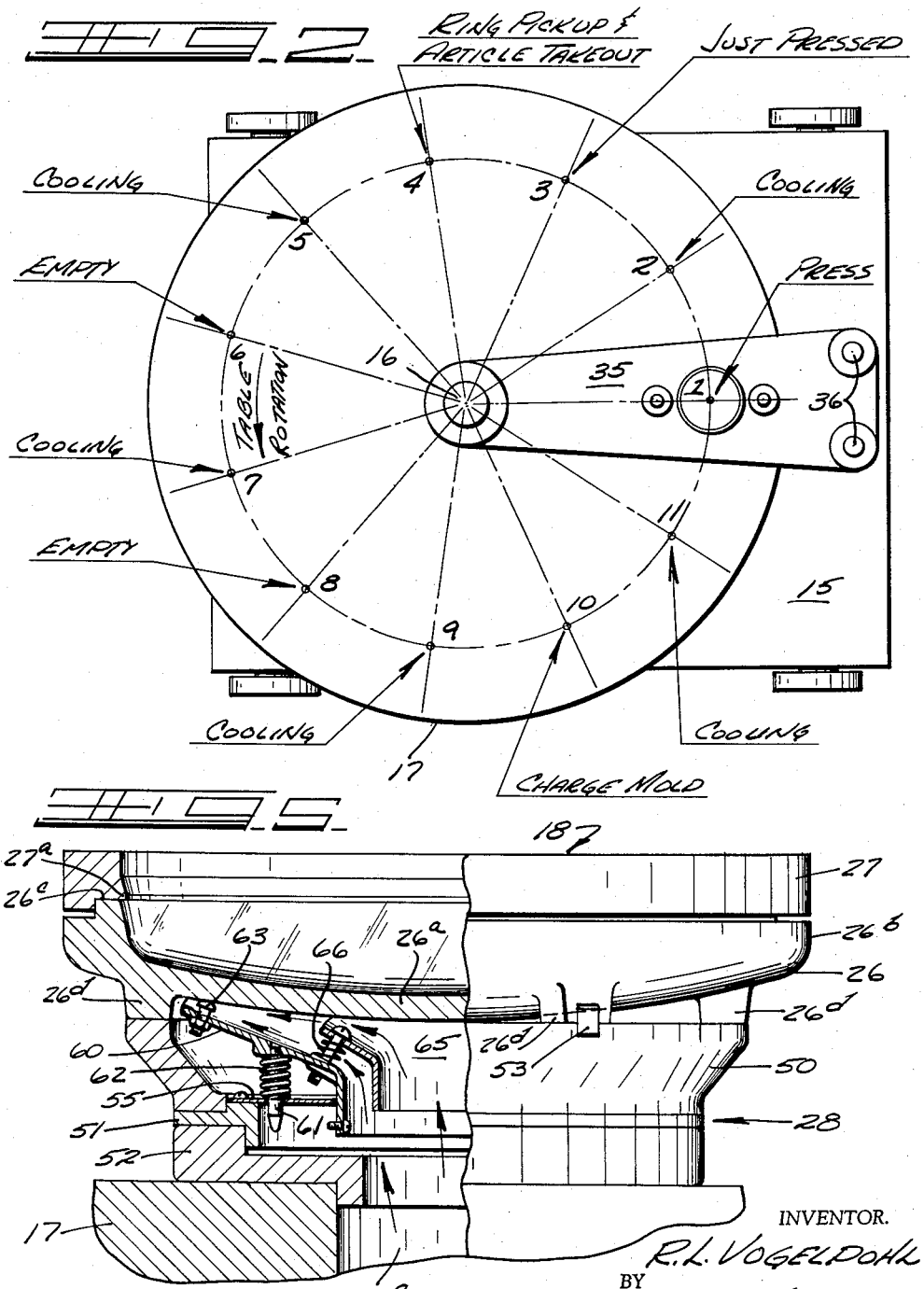
FIG. 2 is a diagrammatic plan view of the machine shown in FIG. 1.

The molds 18 as illustrated are applicable to molding face plates 25 for television picture tubes. Each mold unit 18 (FIGS. 1, 3 and 4) comprises a body mold 26 and a ring mold 27 for molding a portion of the rim of the face plate. When a charge of molten glass has been delivered into the mold at the charging station 10, the next rotational step of the mold table brings the mold directly beneath the press plunger or ram 30 at station 1. Plunger 30 is moved reciprocatably down and up by a fluid-operated motor 31 and includes a press molding head 32 having a configuration adapted to mold the inner surface of the face plate 25. Plunger molding head 32 is shown in broken lines in FIG. 1 to indicate its position within the mold 18 when the mold is at the press station 1. The press plunger is supported by a horizontal arm 35 as shown in FIGS. 1 and 2 mounted on the central column 16 and a pair of vertical standards 36. When the mold unit 18 is aligned in stationary relation at pressing station 1 the mold components are clamped together tightly for press molding of the article by downward projection and then retraction of the press plunger.

When the mold 18 containing the molded article is brought to take-out station 4 the mold ring 27 is lifted upwardly (FIG. 1) away from mold 26 and the molded article 25 to facilitate the removal of the newly-formed article from the machine. The lifting device comprises a horizontal plate 40 connected to the piston rod 41 of an air-operated piston motor or cylinder 42 which is attached to column 16 by a bracket arm 43. Plate 40 is formed with hooked end portions 44 to receive projecting ears 27a of the mold ring as the mold units move into position beneath the lifting plate 40. Air cylinder motor 42 is operated sequentially in alternation with the stepwise movements of the mold table for lifting each molding ring 27 at the take-out station.

Mold unit 18 is shaped and adapted for molding the hollow face plate member of television picture tubes and particularly face plates having an approximately rectangular rim surrounding a concavo-convex viewing panel. The central region 26a of body mold portion 26 is concave in at least one curvilinear plane and is surrounded by sidewalls 26b which are curved outwardly and upwardly. Sidewalls 26b are shown substantially vertical and terminating at a substantially horizontal top surface 26c on which is mounted the mold ring 27. The mold ring has an interiorly projecting ledge portion 27a which forms the terminating upper edge of the molded article 25. Alternately, the mold ring has an interior surface for forming an exterior peripheral surface of the article rim in addition to its terminating edge.

Body mold 26 has an annular series of downwardly projecting legs 26d which terminate in substantially a horizontal plane. Body mold 26 is supported by an annular support pedestal 28 which is comprised of a frusto-conical upper ring 50, an intermediate ring 51 and an annular base plate 52 which rests upon the mold table 17. An opening 17a is provided in the mold table at each mold location into which annular base plate 52 is fitted. Intermediate ring 51 is fixed on an upper region of base plate 52 in telescopic engagement therewith. Upper ring 50 rests upon intermediate ring 51 and has a circular configuration at its lower end complemental to the perimeters of rings 51 and 52. Frusto-conical upper ring 50 is circular at its lower region and rectangular at an upper region (FIG. 3) substantially complemental in contour to the underside of rectangular body mold 26 at the area of its downwardly projecting legs 26d. Upper ring 50 provides a substantially horizontal supporting surface for the body mold 26. A triangular pattern of lug members 53 is fixed within an upper region of frusto-conical ring 50 each adapted to telescopic engagement with complemental recesses in an individual mold support leg 26d.

The central region 26a of the body mold which provides a concave upper molding surface has a substantially uniform thickness throughout its major dimensions at least interiorly of support legs 26d. The lower surface of the mold central region 26a is convex in contour beneath the major molding surfaces of the body mold.

Figure 4:
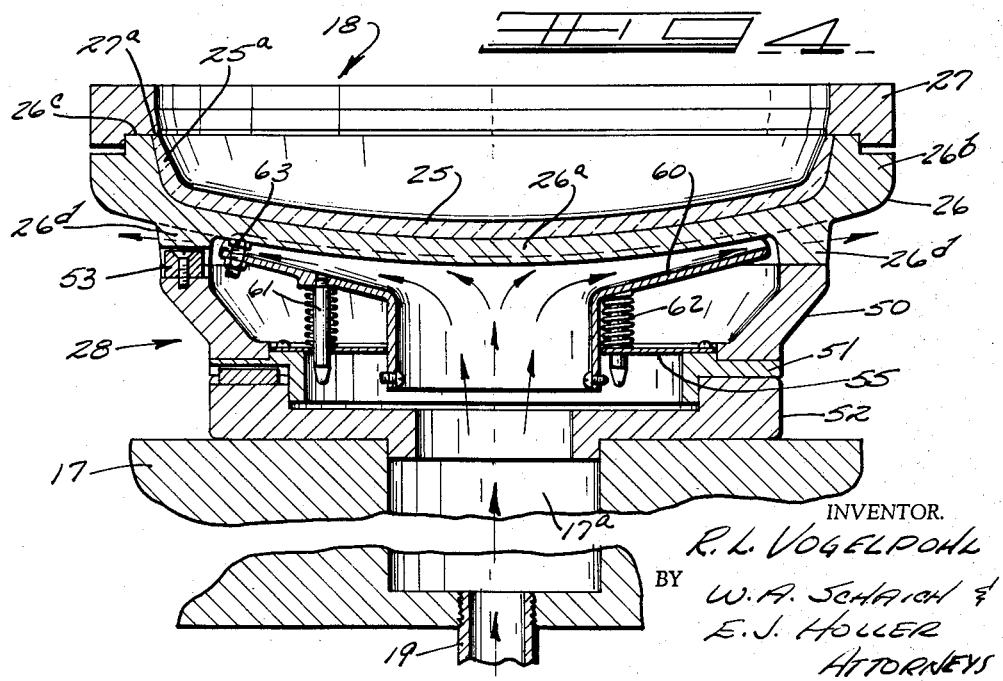
FIG. 4 is a vertical sectional view of the same at the line 4—4 of FIG. 3.

Intermediate ring 51 of the support pedestal carries a substantially horizontal inner support plate 55 having a central opening in coaxial alignment with central openings in annular base plate 52 and table opening 17a. A funnel-shaped deflector member 60 is mounted with its frusto-conical portion between horizontal plate 55 and the underside of the body mold central region 26a. Deflector member 60 has three downwardly-projecting stud members 61 projecting freely through openings in horizontal support plate 55. An individual compression spring 62 surrounds each stud member 61. The frusto-conical portion of deflector member 60 has three spacer elements 63 comprising short machine bolts disposed in triangular relation adjacent the periphery of its terminating edge. Spacer members 63 are adapted to adjustment by lock nuts on their threaded lower ends to regulate the spacing of the deflector member with respect to the underside of the body mold. As shown in FIG. 4 the radially projecting passageway which exists between the upper surface of deflector member 60 and the convex lower surface of the body mold central region 26a converges toward the periphery of the deflector frusto-conical portion when viewed in a series of axial planes.

A gaseous coolant is supplied to the underside of the body mold central region by an inlet line 19 disposed on the lower side of the mold table 17 and is rotatable therewith. The gaseous coolant is supplied thereto from a pressurized air duct contained within the stationary column 16 of the machine. The gaseous coolant which preferably consists of pressurized air is introduced upwardly through the mold table and support pedestal 28 in a direction normal to the underside of the center of the body mold central region. The gaseous coolant is distributed over the underside of the mold central region by the deflector plate 60. The peripheral region of the funnel-shaped deflector may be maintained in close proximity to the underside of the mold central region as the continuous radial layer of the coolant air is directed. It will be obvious from the embodiment shown in FIG. 4 that the deflector member 60 is maintained in close proximity to the body mold central region with compression springs 62 maintaining the deflector in an uppermost position with its periphery adjacent the underside of the body mold. As the gaseous coolant is supplied in greater volume for increased mold cooling the deflector member 60 may be moved downwardly compressing springs 62 to permit the peripheral egress of the coolant therebetween. The gaseous coolant is permitted to discharge between the upper surface of frusto-conical ring 50 of the support pedestal and the underside of the body mold around support legs 26d. Thus, by applying the coolant in the manner described above precise control over the body mold temperature is maintained. Deflector member 60 may be fully integral or segmented into essentially equiangular segments which are individually adjustable for more accurate control of mold temperatures such as those having varying thickness from one side to another. Such segmental separation of the deflector is indicated by broken lines of severance 60a shown in FIG. 3 wherein the deflector cone is divided into three sections A, B and C. Additional stud members 61 can be employed as required to retain the individual sections in vertical alignment.

In a modified form of the fluid coolant distributing means, it will be observed in FIG. 5 that a pair of telescoping funnel-shaped deflector members 60 and 65 are utilizable adjacent the underside of the body mold central region 26a. In this the form of mold cooling deflector member 60 is essentially the same as described hereinabove having its tubular portion passing through an axial opening in horizontal support plate 55 with three spaced-apart stud members 61 passing through openings therein. Compression springs 62 are employed to surround each stud 61 between horizontal plate 55 and the frusto-conical portion of the deflector along with three spacer elements 63 disposed in a spaced-apart outer region thereof. Another deflector member 65 having a tubular portion and a frusto-conical portion of lesser dimensions than that of deflector 60 is mounted interiorly of and immediately above the latter. A spaced-apart series of three spacing elements 66 each surrounded by a compression spring is employed to maintain the two deflector members in desired spaced-apart arrangement. The utilization of a pair of deflector members provides improved distribution of the gaseous coolant over the underside of the body mold central region for precise control of operating temperatures thereof.

The subject mold design permits improved control of temperatures from point to point over the extensive glass forming surfaces of the mold and the combined elements minimize variations in the rate of heat transfer through the mold wall to the cooling medium. The advantages of having the mold bottom fully separable from its supporting pedestal or base facilitates finishing of the bottom mold surface as by machining to provide molds having precisely controllable major wall thicknesses. Thus, by controlling the mold wall thickness at its region of maximum temperatures adjacent the area where the mold is charged, for example, the rate of heat transfer through various sections of the mold is proportioned to the heat input from these respective sections.

The deflector elements contained within the mold support pedestal serve to contain and guide the cooling air or other fluid and maintain the same in intimate contact with the mold bottom during continuous molding operations. The amount of fluid coolant flowing past a prescribed section of the mold can be increased or decreased relative to other mold sections by adjustment of the deflector positions.

Figure 3:
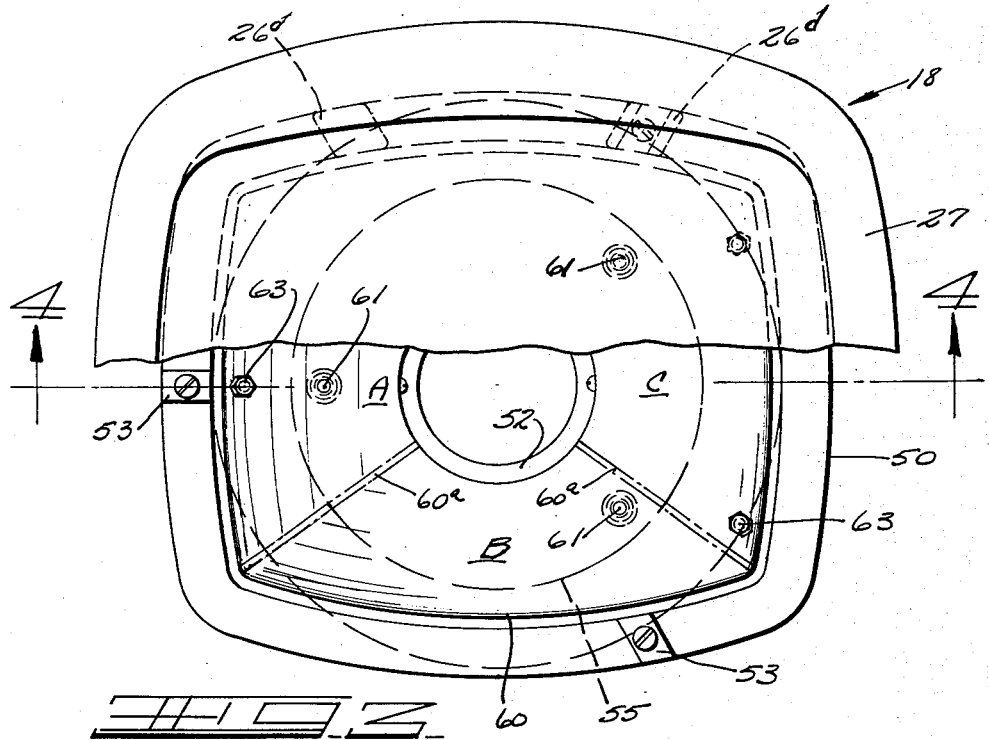
FIG. 3 is a plan view of a single mold and support pedestal assembly on a comparatively large scale.

As shown in FIG. 3, the large single deflector member or cone 60 is comprised of three equi-angular sections A, B and C which are individually controllable with respect to their disposition beneath the mold bottom. Relative amounts of cooling fluid flowing from one side of the mold to the other can be controlled by properly locating the individual sections. By juxtapositioning one section of the deflector cone closer to the mold bottom than the remainder of the cone the peripheral exhaust area is relatively restricted in this section and correspondingly less coolant will flow therepast. Since the amount of heat transferred from the mold to the cooling medium is related to the rate and volume of flow of the cooling medium, this section of the mold will be cooled less than the remaining portions and the glass molding surface temperatures thereabove will be increased.

Where the smaller deflection member or cone 65 is employed in conjunction with cone 60 to proportion the amount of cooling air directed at the center of the mold bottom relative to the total flow of coolant, by moving the smaller proportioning cone 65 upwardly towards the mold bottom, the annular exhaust area between the cone periphery and the mold bottom is decreased and the air flow to the center of the mold is reduced. The proportion of the total inlet coolant directed to an annular region of the mold beyond its center is thereby increased. This proportioning is reversed when the center cone 65 is lowered with respect to the larger cone 60. It is apparent from the drawings how the component parts of the mold are readily separable. The one or more deflector cones are carried by intermediate ring 51 and simple replacement of this member permits changing or altering the coolant guiding means beneath the mold bottom.

Various modifications of the present invention may be resorted to within the spirit and scope of the appended claims.

I claim:

1. A mold for press forming a hollow glass article from a charge of molten glass, said mold being open at its upper end and having upwardly-extending inner wall surfaces surrounding a hollow mold cavity, said mold being comprised of a body portion having a central region of substantial uniform cross-sectional thickness, an annular base portion supporting said body portion peripherally of said central region in radially and vertically-spaced relation thereto providing an unconfined intermediate space therebetween, means for introducing a gaseous coolant internally of said supporting base portion, and guiding means disposed within said base portion adjacent the underside of the central region of said body portion for controlling the outwardly-flaring distribution of said gaseous coolant thereover in a continuous layer prior to its discharge through an unconfined space, said body portion and said coolant guiding means having dissimilar peripheral configurations.

2. A mold for press molding a hollow glass article in accordance with claim 1, wherein said guiding means comprises at least one funnel-shaped member having its frusto-conical portion disposed adjacent and flaring in the direction of the underside of said body mold central region and adjustment means for positioning said funnel-shaped member within said base portion with respect to said body mold central region.

3. A mold for press molding a hollow glass article in accordance with claim 1, wherein said coolant introducing means comprises a central opening extending through said base portion and an inlet line for introducing pressurized air thereinto, and said guiding means comprises at least one funnel-shaped member disposed in essentially coaxial alignment with said mold cavity and said central opening in said base portion.

4. A mold unit for press molding a hollow glass article having a concave body portion surrounded by a peripheral rim portion, said mold unit comprising a body mold, a ring mold positioned over the body mold and forming therewith an upwardly-opening mold cavity, an annular support pedestal positioned below said body mold for peripherally supporting same at radially-spaced locations in molding relation with an intermediate unconfined space therebetween, said body mold having a concave upper molding surface and a convex lower surface in a central region and a surrounding upright rib defining the periphery of said article concave portion, the concavo-convex central region of said body mold having a substantially uniform thickness throughout, an inlet duct mounted within said support pedestal for introducing a gaseous coolant therethrough, and guiding means positioned internally of said support pedestal below the central region of said body mold for controlling distribution of said coolant over the convex lower surface of said body mold central region prior to its free discharge through an unconfined space.

5. The mold unit for press molding a hollow glass article in accordance with claim 4, wherein said coolant introducing means comprises a pressurized air inlet line and a central opening extending axially through said support pedestal, and said guiding means comprises at least one cone-shaped member flaring in the direction and adjacent the convex lower surface of said body mold central region.

6. The mold unit for press molding a hollow glass article in accordance with claim 4, wherein said guiding means comprises a pair of funnel-shaped deflector members disposed in telescoping relation with their frusto-conical portions flared in the direction of the lower surface of said body mold central region, the said frusto-conical portions of said deflector members converging in a radial direction with respect to the lower surface of said body mold central region when taken along vertical axial planes thereof, and adjustment means for positioning each of said deflector members with respect to each other and in spaced relation from said lower surface of said body mold central region.

7. A mold unit for press molding a hollow glass article having a concave body portion surrounded by a peripheral rim portion, said mold unit comprising a body mold, a ring mold positioned over the said body mold and forming therewith an upwardly-opening mold cavity, an annular support pedestal positioned below said body mold for peripherally supporting same in upwardly-spaced molding relation with an open annulus therebetween, said body mold having a concave upper molding surface and a convex lower surface in a central region and a surrounding rib for defining the exterior bottom surface of the article and a portion of the rim exterior surface, the central region of said body mold having a substantially uniform thickness throughout, means for introducing a stream of gaseous coolant from a point adjacent the center of said support pedestal, at least one funnel-shaped deflector member positioned internally of said support pedestal beneath the central region of said body mold for guiding the movement of the gaseous coolant in a continuous layer over the convex lower surface of said body mold central region to discharge the same through said open annulus, said deflector member providing a frusto-conical surface spaced from the convex lower surface of said central portion and defining a passageway from the center of said deflector member to the periphery of said deflector member having gradually decreasing cross-section from the center to the periphery of said deflector member taken along axial planes thereof.

8. In an apparatus for forming a hollow glass article by pressing a plunger downwardly into contact with a charge of molten glass placed in a hollow mold unit having an internal molding surface corresponding to the external configuration of the article which is to be formed, said plunger having an external molding surface corresponding to the internal configuration of the article which is to be formed, said article having a body portion surrounded by a peripheral rib portion, the improvement wherein said hollow mold unit comprises a body mold open at its upper end having a central region of substantially uniform cross-sectional thickness providing its upper concave molding surface, an annular support pedestal positioned below and supporting said body mold peripherally of its central region with an intermediate unconfined annular space therebetween, a vertical inlet duct for introducing a gaseous coolant upwardly disposed adjacent the center of said support pedestal, and guiding means disposed internally of said support pedestal for controlling distribution of said gaseous coolant over said body mold central region in a continuous radially-projecting layer to discharge through said unconfined annular space.

9. The combination set forth in claim 8, wherein the said deflector means comprises at least one funnel-shaped member having a frusto-conical portion flaring in the direction and adjacent the lower surface of said central region to direct the flow of the said coolant thereagainst in a radial pattern.

10. The combination set forth in claim 8, wherein the said guiding means comprises at least one funnel-shaped member having frusto-conical and tubular portions, the said frusto-conical portion flaring in the direction and adjacent the lower surface of the body mold central region to direct the flow of said coolant thereagainst in a radial pattern and said unconfined space consisting of a peripheral opening between said body mold and said support pedestal to facilitate the radial discharge of said coolant therebetween.

11. In an apparatus for forming a hollow glass article by pressing a plunger downwardly into contact with a charge of molten glass placed in a mold unit having an internal molding surface corresponding to the external configuration of the article which is to be formed, said plunger having an external molding surface corresponding to the internal configuration of the article which is to be formed, said article having a concave body portion surrounded by a peripheral rib portion, the improvement wherein said mold unit comprises a body mold open at its upper end and having a central region of substantially uniform thickness throughout the major portion of its concave upper molding surface, an annular support pedestal positioned below and supporting said body mold at spaced-apart areas peripherally of its central region, a spaced-apart series of lug members interconnecting said body mold and said support pedestal with an open annulus therebetween, means for introducing a pressurized gaseous coolant internally of said support pedestal to impinge upon a lower surface of said body mold central region beneath its upper molding surface, and at least one funnel-shaped deflector member disposed internally of said support pedestal having its flared portion adjacent the lower surface of said central region for controlling distribution of said gaseous coolant thereover in a continuous layer.

References Cited in the file of this patent

UNITED STATES PATENTS

| 2,853,835 | Tallent | Sept. 30, 1958 |
| 2,882,647 | Tallent | April 21, 1959 |
| 2,901,865 | McCormick | Sept. 1, 1959 |